United States Patent
Duranton

(10) Patent No.: US 6,901,487 B2
(45) Date of Patent: May 31, 2005

(54) DEVICE FOR PROCESSING DATA BY MEANS OF A PLURALITY OF PROCESSORS

(75) Inventor: Marc Duranton, Suresnes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 232 days.

(21) Appl. No.: 10/120,682

(22) Filed: Apr. 11, 2002

(65) Prior Publication Data

US 2002/0166015 A1 Nov. 7, 2002

(30) Foreign Application Priority Data

Apr. 12, 2001 (FR) .............................. 01 05022

(51) Int. Cl.⁷ .............................................. G06F 12/00
(52) U.S. Cl. ....................... 711/151; 711/147; 711/148; 711/149; 711/150; 711/206; 711/207; 710/40; 710/113; 710/114; 710/115; 710/116; 710/240; 710/241; 710/242; 710/243; 710/244
(58) Field of Search ................................ 711/147, 148, 711/149, 150, 151, 206, 207; 710/40, 113, 114, 115, 116, 240, 241, 242, 243, 244

(56) References Cited

U.S. PATENT DOCUMENTS 5,682,512 A * 10/1997 Tetrick ...................... 711/202
6,052,753 A * 4/2000 Doerenberg et al. ......... 710/305
6,157,989 A * 12/2000 Collins et al. .............. 711/151

FOREIGN PATENT DOCUMENTS

WO    WO9532578    11/1995

* cited by examiner

Primary Examiner—Donald Sparks
Assistant Examiner—Bao Q Truong
(74) Attorney, Agent, or Firm—Michael J. Ure

(57) ABSTRACT

A data processing device comprises a plurality of processors that are to access a memory system. The memory system comprises at least two memories The data processing device comprises a bus per memory. The buses are interconnected by at least one bridge. A processor is connected to a bus, and the data processing device comprises at least one memory table specifying with which memory an exchange of a data item between a processor and the memory system must be effected.

3 Claims, 4 Drawing Sheets

DEVICE FOR PROCESSING DATA BY MEANS OF A PLURALITY OF PROCESSORS

The invention relates to a data processing device comprising a plurality of processors that are to access a memory system. The invention finds its application, for example, in a system dedicated to an application with constraints of the real-time type, such as a video data processing device like a decoder or a receiver decoder for television (set top box).

In integrated circuits, data processing may be effected by several processors which have access to data stored in a memory. International patent application WO 95/32578 describes a decoder for digital television, comprising several processors and an external memory. Data transfers between the external memory and the different processors take place by way of a collective bus. A control unit controls the external memory and the collective bus so as to optimize the data transfers.

Data transfers between a processor and a memory generally take place via a bus as described in the above-mentioned international patent application. A conventional configuration is the use of a collective bus through which different processors can have access to a collective memory. When several processors are connected to a single memory by means of a collective bus, the processors cannot simultaneously have access to this memory, which generates relatively long reaction times in the processing of data because a processor wishing to access the memory must wait until this memory is free. For applications with constraints of the real-time type, such as in video data processing, it is necessary to reduce these reaction times. Moreover, to ensure these data transfers, the bus must have a certain passband in terms of the number of bits per unit of time. A sum of the speeds at which the processors consume and produce data, in case of reading or writing data in the memory, determines the passband that is necessary for the bus. With the evolution of technologies such as a standard high definition in digital television, the required passbands of the bus are large and cannot be easily achieved with a configuration as described above.

It is an object of the invention to provide a data processing device with which the passband can be augmented and the reaction times can be reduced.

According to the invention, a data processing device as described in the opening paragraph is characterized in that
- the memory system comprises at least two memories;
- the data processing device comprises one bus per memory;
- the buses are interconnected by at least one bridge;
- a processor is connected to a bus and
- the data processing device comprises at least one memory table specifying with which memory an exchange of a data item between a processor and the memory system must be effected.

When a processor wishes to exchange data with the memory system, i.e. when it wishes to read or write data in the memory system, it specifies, to the bus to which it is connected, a memory system address at which it wishes to read or write these data. By virtue of a memory table, this bus then defines in which memory the data considered must be read or written and at which location in the memory the data must be read or written. If this memory is directly connected to this bus, the exchange of data takes place via the bus. If this memory is connected to another bus, the exchange of data takes place via the bridge or bridges connecting this other bus to the bus to which the processor under consideration is connected. Thus, two processors can simultaneously access the memory system if the data to which they wish to have access are present in different memories. The result is an augmentation of the passband because of a higher bus number and a reduction of the reaction times.

In a particular embodiment of the invention, the data processing device comprises an arbiter which is intended to define an order of priority of access to a given memory by the processors in a case where several processors wish to simultaneously access this given memory. This arbiter allows a reduction of the reaction times in case of conflicts, i.e. when several processors wish to access the same memory simultaneously. Moreover, it is possible to considerably reduce the number of conflicts by judicially placing the data in the memories.

The invention will be better understood and other details will be apparent from the following description with reference to the accompanying drawings given by way of non-limitative examples, in which.

Figure 1:
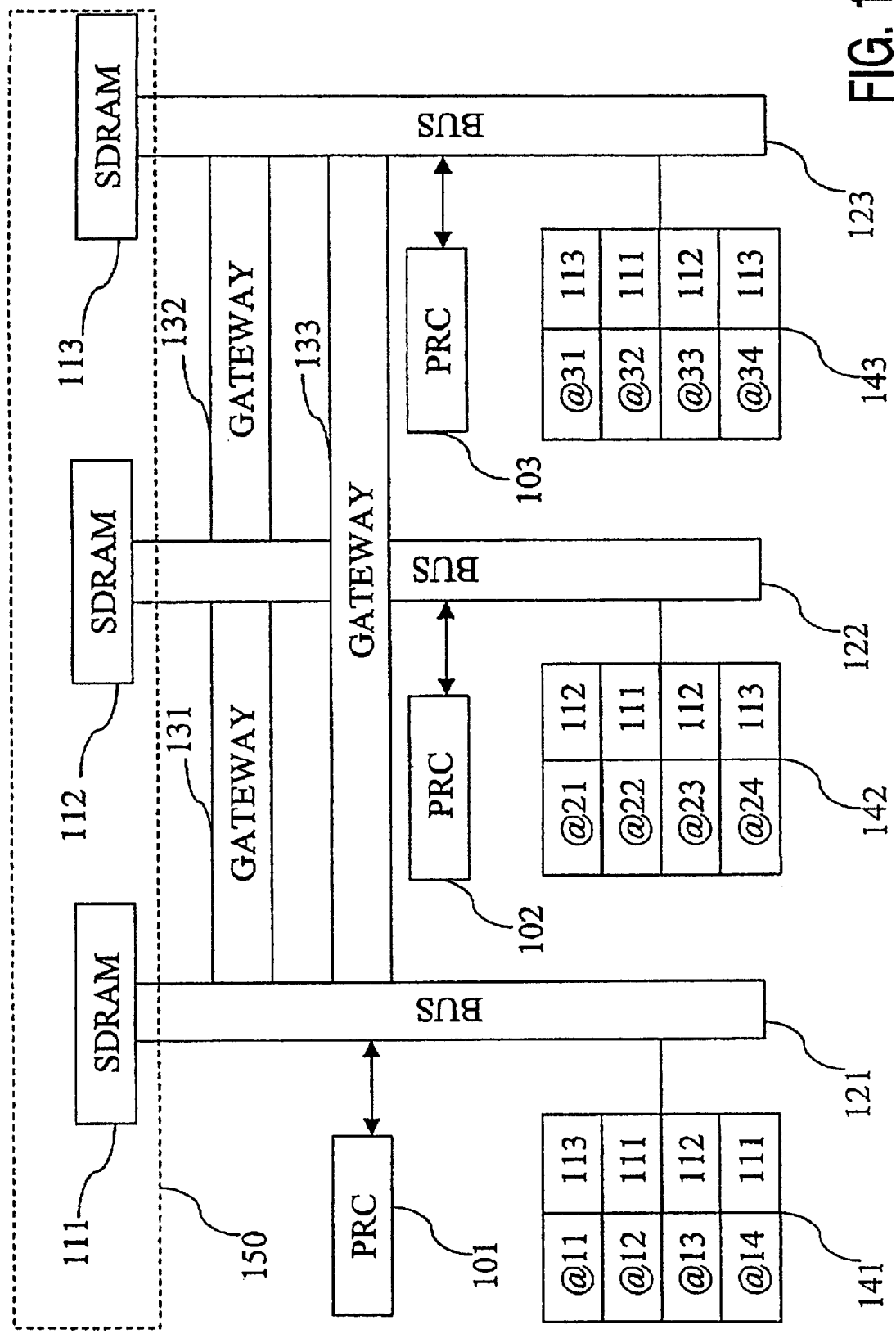
FIG. 1 is a diagram illustrating characteristic features of the invention.

FIG. 1 illustrates characteristic features of the invention. A data processing device according to the invention comprises a first processor 101, a second processor 102, a third processor 103, a first memory 111, a second memory 112 a third memory 113, a first bus 121, a second bus 122, a third bus 123, a first bridge 131, a second bridge 132, a third bridge 133, a first memory table 141, a second memory table 142 and a third memory table 143. The assembly of three memories 111, 112 and 113 constitutes a first memory system 150. The example illustrated applies to three processors that are to access three synchronous dynamic memories. It will be evident that the invention is also applicable to different numbers of processors or synchronous dynamic memories. The invention is also applicable to other types of memories, for example dynamic memories or static memories.

When the first processor 101 wishes to read or write a data item in the first memory system 150, it specifies an address of this data item to the first bus 121. By virtue of the first memory table 141 in the first bus 121, this bus defines in which memory 111, 112 or 113 the data item must be read or written. In a case where the data item must be read in the first memory 111, a transfer of this data item is effected via the first bus 121. In a case where the data item must be read in the second memory 112, a transfer of this data item is effected via the first bridge 131 and the first bus 121. In a case where the data item must be read in the third memory 113, a transfer of this data item is effected via the third bridge 133 and the first bus 121. From a point of view of the first processor 101, the fact that the data item to be read is present in the first memory 111, the second memory 112 or the third memory 113 is not important; reading of a data item is effected in the same manner as when there were only one memory, which would be the first memory system 150. Due to this fact, a model of a unified memory structure is respected, which is beneficial for a programmer who must program the data processing device. An identical reasoning applies to writing a data item in the first memory system 150, as well as to an access to the first memory system 150 by the second processor 102 and the third processor 103. If, as in the prior art, there were only a single memory, there would be a conflict as soon as at least two processors would wish to read or write data simultaneously in this single memory. Here it is possible that at least two processors can read or write data simultaneously in the first memory system 150 as soon as the memories in which these data must be read or written are different. For example, let it be assumed that the first processor 101 wishes to read a data item which is present in the second memory 112, the second processor 102 wishes to read a data which is present in the first memory 111 and the third processor 103 wishes to read a data which is present in the third memory 113, then these actions would be simultaneously possible, which would not have been possible in the prior art. Consequently, the fact that several buses and several memories are used allows an augmentation of the passband and a reduction of the reaction times. The function of the memory tables 141, 142 and 143 is as follows. The first memory table 141 is related to the first bus 121, the second memory table 142 is related to the second bus 122 and the third memory table 143 is related to the third bus 123. The left-hand part of each memory table comprises addresses in the first memory system 150. The right-hand part of each memory table indicates to which memory 111, 112 or 113 these addresses correspond. For example, the address @11 will be specified by the first processor 101 when it wishes to read the data item stored at this address in the first memory system 150. The first memory table 141 will then allow the first bus 121 to define the memory in which this data item must be read, i.e. the first memory 111 in this case. Similarly, the data item stored at the address @23 in the first memory system 150 is situated in the second memory 112 and the data item stored at the address @33 in the first memory system 150 is situated in the second memory 112. It is to be noted that the addresses in the left-hand parts of the memory tables may be identical for two different memory tables, as two different memory tables may wish to access identical data.

Figure 2:
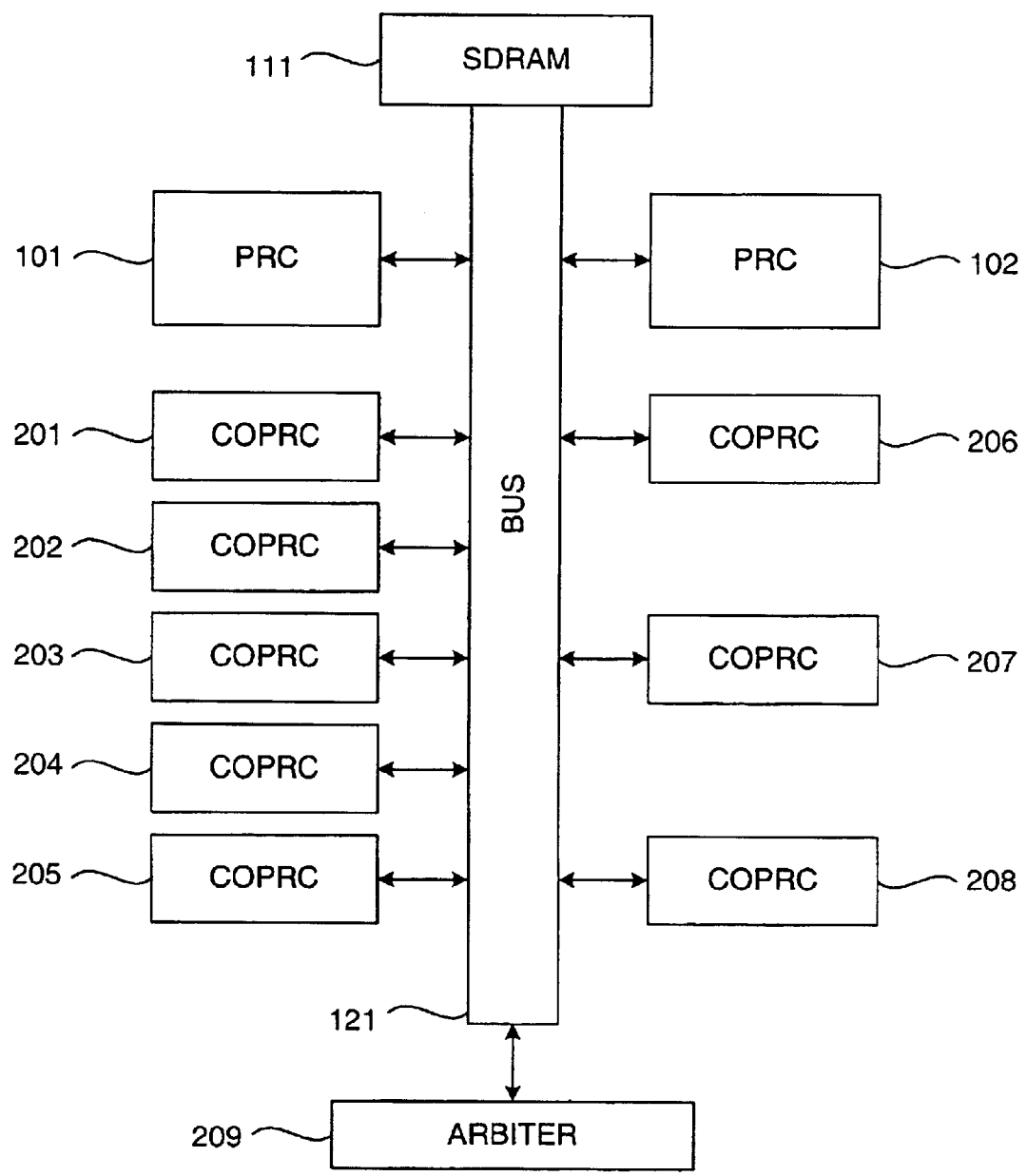
FIG. 2 illustrates an example of a structure of a data processing device comprising a single memory.

FIG. 2 illustrates an example of a structure of a data processing device comprising a single memory. Such a data processing device comprises the first processor 101, the second processor 102, the first memory 111, the first bus 121 and eight co-processors enumerated 201 to 208. The co-processors 201 to 205 are the co-processors of the first processor 101 and the co-processors 206 to 208 are the co-processors of the second processor 102. It will be evident that the number of co-processors is chosen by way of example and that it may be increased or decreased.

If at least two of the co-processors 201 to 205 or at least one of the co-processors 201 to 205 and the first processor 101 simultaneously wish to read or write a data item in the first memory 111, an arbiter 209 is charged with the task of defining, among the co-processors 201 to 205 and the first processor 101, which one has priority of access to the first memory 111. The same applies to the second processor 102 and the co-processors 206 to 208. Such an arbiter 209 is known to those skilled in the art; it may be implemented, for example, as a fixed access scheme or a priority access scheme known to those skilled in the art. Let it be assumed that the first processor 101 and the second processor 102 have priority of access to the first memory 111 and that these two processors simultaneously wish to read or write a data in the first memory 111. The arbiter 209 must then define which of these processors has priority of access to the first memory 111, and only one of the two processors will then have access to the first memory 111. This results in relatively long reaction times.

Figure 3:
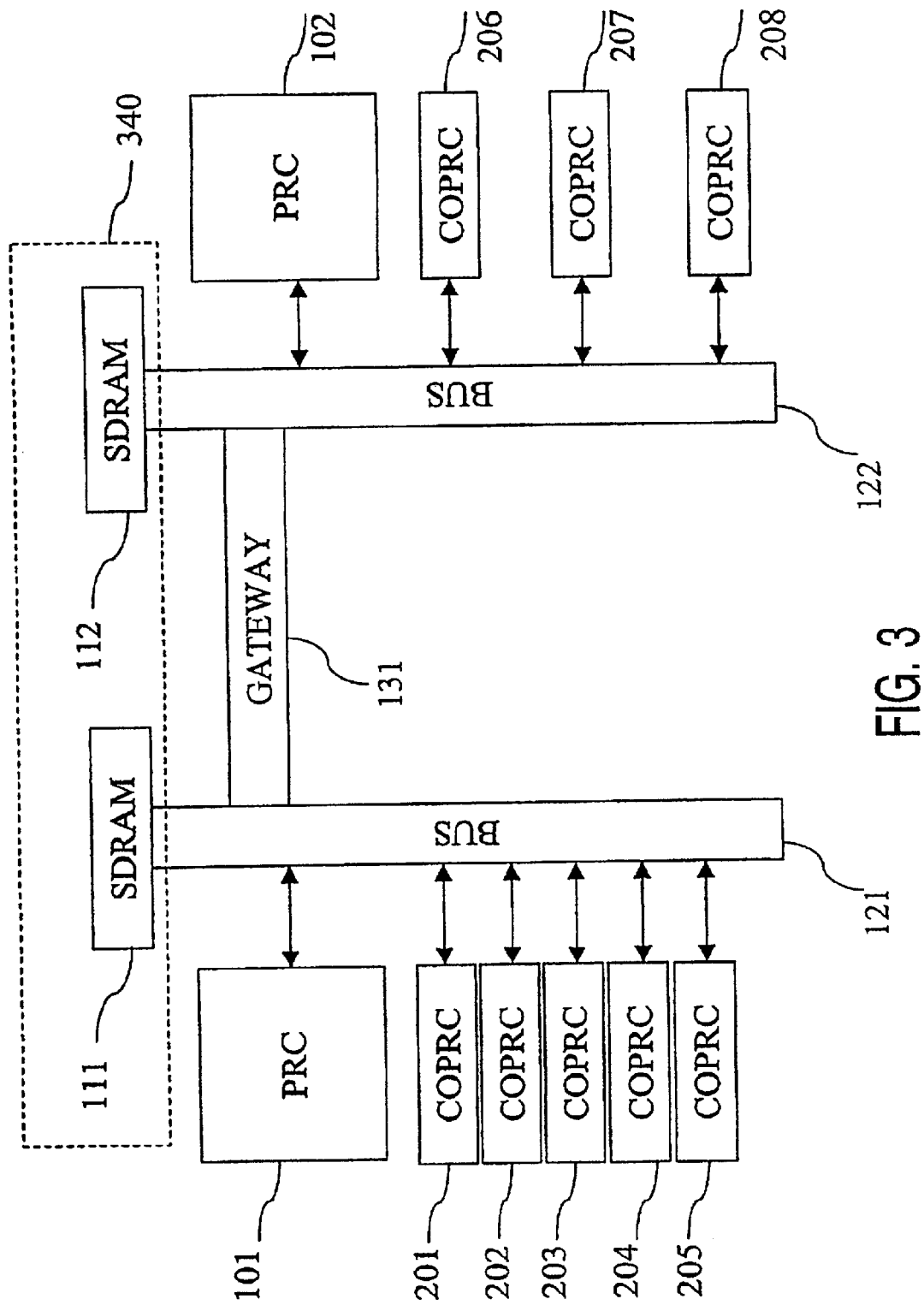
FIG. 3 illustrates an example of a structure of a data processing device using two processors and co-processors according to the invention.

FIG. 3 illustrates an example of a structure of a data processing device using two processors and co-processors according to the invention. Such a data processing device comprises the first processor 101, the second processor 102, the first memory 111, the second memory 112, the first bus 121, the second bus 122, the first bridge 131 and the eight co-processors 201 to 208. The assembly of the two memories 111 and 112 constitutes a second memory system 340. The first memory table 141 as well as the second memory table 142, described with reference to FIG. 1, are not shown in FIG. 3.

A definition as to order of priority of access to the second memory system 340 between the first processor 101 and the co-processors 201 to 205 is effected as described with reference to FIG. 2. The same applies to the second processor 102 and the co-processors 206 to 208. Let it be assumed that the co-processor 204 and the second processor 102 are each given priority to read a data item in the second memory system 340. If the memory tables of the first bus 121 and the second bus 122, whose function has been described with reference to FIG. 1, indicate that the data item to be read by the co-processor 204 is present in the first memory 111 and that the data item to be read by the second processor 102 is present in the second memory 112, then the data could be simultaneously read via the first bus 121 and the second bus 122. If the memory tables of the first bus 121 and the second bus 122 indicate that the data item to be read by the co-processor 204 is present in the second memory 112 and the data item to be read by the second processor 102 is present in the first memory 111, then the data could be simultaneously read via the first bus 121, the second bus 122 and the first bridge 131. However, if the memory tables of the first bus 121 and the second bus 122 indicate that the data to be read by the co-processor 204 and the second processor 102 are present in the same memory 111 or 112, then there would be a conflict and an arbiter would then be charged with the task of defining an order of priority between the co-processor 204 and the second processor 102. It will then be advantageous to use the same arbiter as that introduced in the description of FIG. 2. Based on the foregoing, it will be noted that the number of conflicts is considerably reduced as compared with the prior art. Moreover, it is possible to judicially place the data in different memories. Indeed, the data to which the second processor 102 as well as the co-processors 206 to 208 will have no access or little access will be advantageously placed in the first memory 111, and the data to which the first processor 101 as well as the co-processors 201 to 205 have no or little access will be advantageously placed in the second memory 112. Such a judicial placement could take place during compilation of a program defining different operations to be performed by the data processing device. The number of conflicts is thus further reduced. Consequently, as compared with the prior art, the invention provides the possibility of obtaining a passband which is multiplied by a factor of about two and reaction times divided by a factor of also about two, in the example of the structure under consideration, which in this case comprises two memories 111 and 112.

Figure 4:
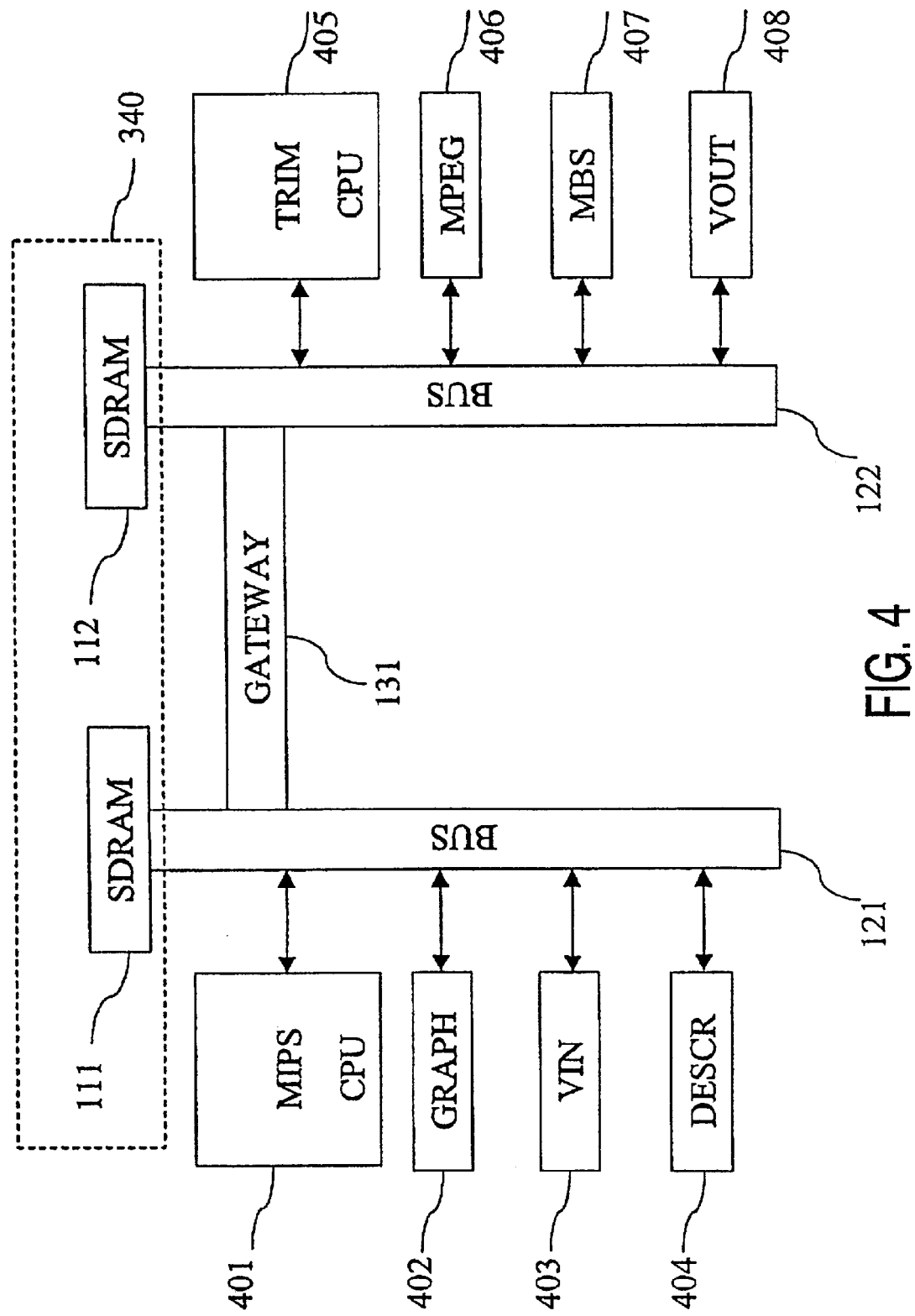
FIG. 4 illustrates an example of using the invention in a circuit for processing audiovisual data.

FIG. 4 illustrates an example of using the invention in a decoder for processing audiovisual data. In addition to the elements already described with reference to the previous Figures, such a decoder comprises a control processor 401, a graphic co-processor 402, an input co-processor 403, a decrypting co-processor 404, a processor 405, a decoding co-processor 406, a format co-processor 407 and an output co-processor 408.

The control processor 401 is notably responsible for interactive applications, control functions and graphic processing operations. The processor 405 is notably responsible for processing audiovisual data in real time. A processor may perform various data processing operations or demand one of its co-processors to perform certain operations. The input co-processor 403 is charged with the task of storing a stream of encrypted audiovisual data in the second memory system 340. The decrypting co-processor 404 is charged with the task of decrypting these data and of placing the decrypted data in the second memory system 340. The graphic co-processor 402 may add graphic data to the audiovisual data, and the data resulting from such a processing operation are stored in the second memory system 340. The decoding co-processor 406 is charged with the task of decoding the audiovisual data, for example, data of an MPEG format. The format co-processor 407 is charged with the task of converting data from one format to another. For example, it may convert audiovisual data of a high-definition format to a standard definition format. The output co-processor 408 is charged with the task of sending the audiovisual data thus processed to another processing device, for example, a television screen. Consequently, all of the processors and co-processors need to have access to the second memory system 340. The audiovisual data may comprise several successive frames. This is the case in a succession of images forming a film. In this case, each image must be successively processed by the processing circuit. When it is assumed that 25 images must thus be processed in one second, one will understand that the number of conflicts between the different processors and co-processors increases accordingly, so that the time to process the audiovisual data also increases. By allowing a reduction of this number of conflicts, the invention allows a reduction of the processing time. Such a decoder may form part of a receiver decoder device for television, referred to as set top box.

The foregoing description with reference to the Figures illustrates rather than limits the invention. In this respect several remarks are made below. FIGS. 1, 3 and 4 illustrate examples of structures of data processing devices according to the invention. It is possible to carry the invention into effect in a different way without departing from the scope of the invention. For example, it is possible to carry the invention into effect with larger or smaller numbers of processors, co-processors, memories, bridges and memory tables. The invention is also applicable to a large number of electronic systems and not only to a device for processing audiovisual data. In this respect, the invention is advantageously used in an electronic system requiring large passbands and relatively small reaction times.

What is claimed is:

1. A data processing device comprising a plurality of processors that are to access a memory system, comprising:
    at least two memories included in said memory system;
    one bus per memory;
    at least one bridge interconnecting the buses;
    a processor connected to a bus; and
    at least one memory table specifying with which memory an exchange of a data item between a processor and the memory system must be effected;
    wherein plural non-conflicting memory accesses, including accesses through said bridge, are executed simultaneously.

2. A data processing device as claimed in claim 1, further comprising an arbiter which is intended to define an order of priority of access to a memory among the at least two memories in a case where several processors wish to access said memory simultaneously.

3. A method for exchanging a data item between a processor and two or more memories, comprising:
    accessing a memory table to determine a particular memory included in the two or more memories to read the data item from or to write the data item to;
    transmitting the data item over a first bus associated with the processor;
    transmitting the data item over at least one bridge; and
    transmitting the data item over a second bus associated with the memory, wherein the at least one bridge interconnects the first bus to the second bus;
    wherein plural non-conflicting memory accesses, including accesses through said bridge, are executed simultaneously.

* * * * *